US008140973B2

(12) United States Patent
Sandquist et al.

(10) Patent No.: US 8,140,973 B2
(45) Date of Patent: Mar. 20, 2012

(54) ANNOTATING AND SHARING CONTENT

(75) Inventors: Jeff D Sandquist, Fall City, WA (US);
Grace G Francisco, San Carlos, CA (US); David D Shadle, Sammamish, WA (US); Sanjay Parthasarathy, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 706 days.

(21) Appl. No.: 12/018,786

(22) Filed: Jan. 23, 2008

(65) Prior Publication Data
US 2009/0187825 A1  Jul. 23, 2009

(51) Int. Cl.
*G06F 3/14* (2006.01)
*G06F 3/17* (2006.01)

(52) U.S. Cl. ........ 715/719; 715/512; 715/721; 715/723; 704/270; 705/14; 707/5; 707/102; 707/764; 707/769; 725/146; 726/7

(58) Field of Classification Search .......... 715/200–177, 715/700–867, 512; 700/701–866; 709/201–229; 705/50–79; 345/30–111; 707/1–10, 100–104.1, 707/200–206, 769; 726/7; 704/270; 370/260; 725/146

See application file for complete search history.

(56) References Cited

U.S. PATENT DOCUMENTS

| | | | |
|---|---|---|---|
| 5,717,468 A | 2/1998 | Baryla | |
| 5,742,730 A | 4/1998 | Couts et al. | |
| 6,332,144 B1 | 12/2001 | deVries et al. | |
| 6,988,245 B2 * | 1/2006 | Janevski | 715/723 |
| 7,257,774 B2 | 8/2007 | Denoue et al. | |
| 7,536,713 B1 * | 5/2009 | Bartholomew | 726/7 |
| 7,647,555 B1 * | 1/2010 | Wilcox et al. | 715/721 |
| 2002/0089519 A1 | 7/2002 | Betz et al. | |
| 2002/0099552 A1 * | 7/2002 | Rubin et al. | 704/270 |
| 2004/0125133 A1 | 7/2004 | Pea et al. | |
| 2004/0237032 A1 | 11/2004 | Miele et al. | |
| 2005/0234958 A1 * | 10/2005 | Sipusic et al. | 707/102 |
| 2005/0289453 A1 * | 12/2005 | Segal et al. | 715/512 |
| 2006/0161838 A1 * | 7/2006 | Nydam et al. | 715/512 |
| 2006/0218481 A1 | 9/2006 | Adams et al. | |
| 2007/0011206 A1 | 1/2007 | Gupta et al. | |
| 2007/0133437 A1 * | 6/2007 | Wengrovitz et al. | 370/260 |
| 2007/0136656 A1 * | 6/2007 | Nydam et al. | 715/512 |
| 2007/0240060 A1 | 10/2007 | Berenbach et al. | |

(Continued)

FOREIGN PATENT DOCUMENTS

WO    WO9946702 A1    9/1999

OTHER PUBLICATIONS

Adams, et al. "IBM Multimodal Annotation Tool" Aug. 2002, pp. 1-2.
"BT Technology", pp. 1-3.

(Continued)

*Primary Examiner* — Ruay Ho

(57) ABSTRACT

Aspects of the subject matter described herein relate to annotating and sharing content. In aspects, an annotation tool presents a user interface that allows a user to enter and view annotations associated with content such as a video. The annotation tool allows the user to associate each annotation with a particular time segment of the video such that when that time segment is played in a video player, its associated annotation is presented. The annotation tool also presents a user interface that allows the user to share the video as annotated with other users as desired. Other users receiving the annotated video may further annotate the video and share it with others.

16 Claims, 10 Drawing Sheets

U.S. PATENT DOCUMENTS

| | | | |
|---|---|---|---|
| 2007/0245243 | A1 | 10/2007 | Lanza et al. |
| 2007/0250901 | A1* | 10/2007 | McIntire et al. .............. 725/146 |
| 2009/0064005 | A1* | 3/2009 | Cunningham et al. ........ 715/764 |
| 2009/0119169 | A1* | 5/2009 | Chandratillake et al. ....... 705/14 |
| 2009/0198685 | A1* | 8/2009 | Bartholomew ................... 707/5 |
| 2010/0293190 | A1* | 11/2010 | Kaiser et al. ................. 707/769 |

OTHER PUBLICATIONS

"YouTube Launches Custom Video Player | Personalised Viewing Video Tool", Webtvwire.com, pp. 1-4.

Gruber, "Viddler: Embed Comments & Tag Video", Apr. 25, 2007, pp. 1-3.

* cited by examiner

ANNOTATING AND SHARING CONTENT

BACKGROUND

Current content sharing mechanisms allow a user to embed a video player on a Web page. The user links the video player to video content that exists somewhere on the Web. When someone browses to the Web page, the video player presents the video on the browser. This provides a convenient way for people to share pre-defined content with each other, but it does not allow user to personalize or add additional content to the shared pre-defined content.

SUMMARY

Briefly, aspects of the subject matter described herein relate to annotating and sharing content. In aspects, an annotation tool presents a user interface that allows a user to enter and view annotations associated with content such as a video. The annotation tool allows the user to associate each annotation with a particular time segment of the video such that when that time segment is played in a video player, its associated annotation is presented. The annotation tool also presents a user interface that allows the user to share the video as annotated with other users as desired. Other users receiving the annotated video may further annotate the video and share it with others.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Exemplary Operating Environment

Figure 1:
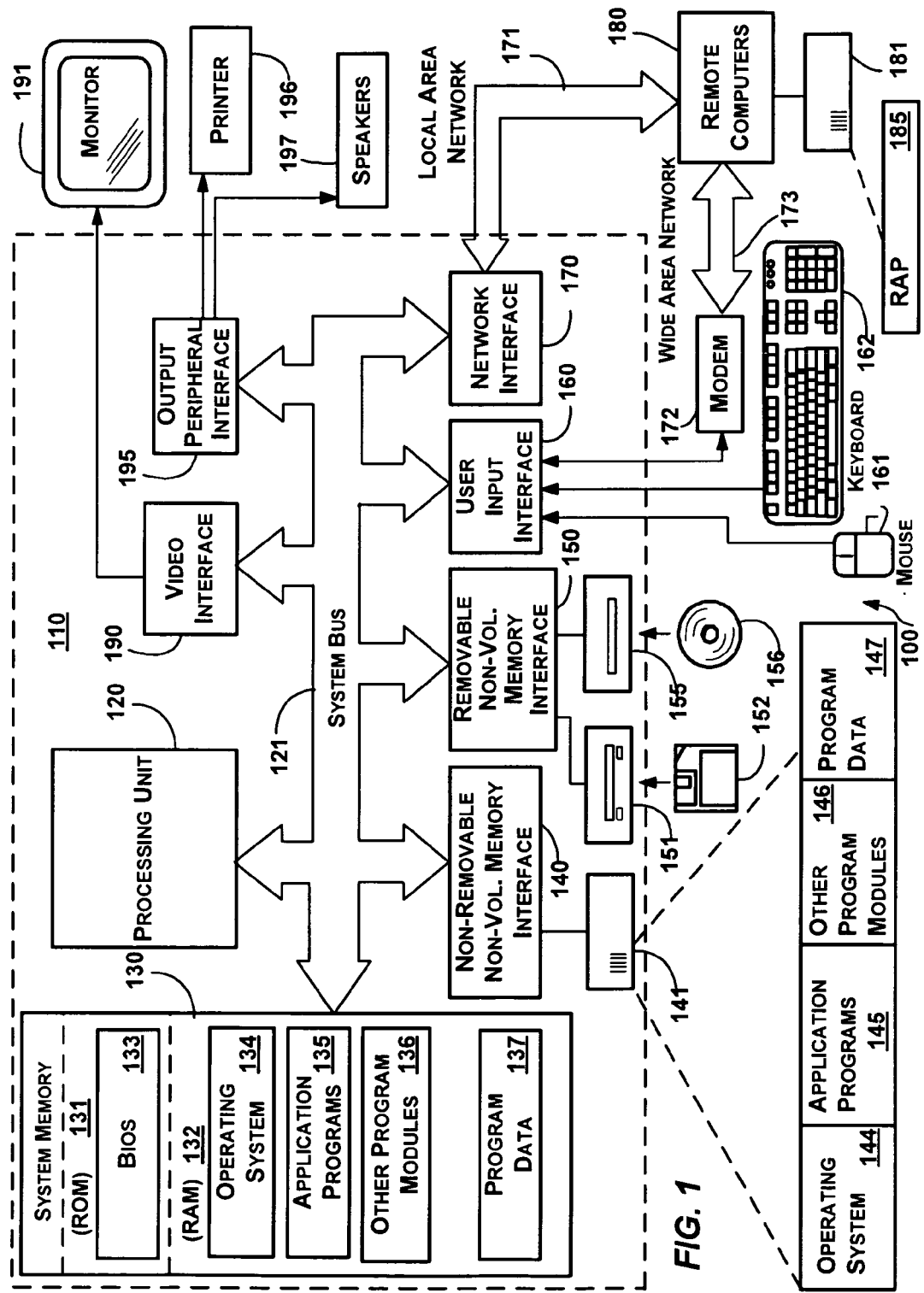
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Annotating and Sharing Content

As mentioned previously, current content sharing mechanisms do not allow a user to easily add content to pre-existing content. A user may select different content to display, but is not given the option of changing or annotating existing content. Aspects of the subject matter described herein relate to providing a mechanism for annotating and sharing content.

Figure 2:
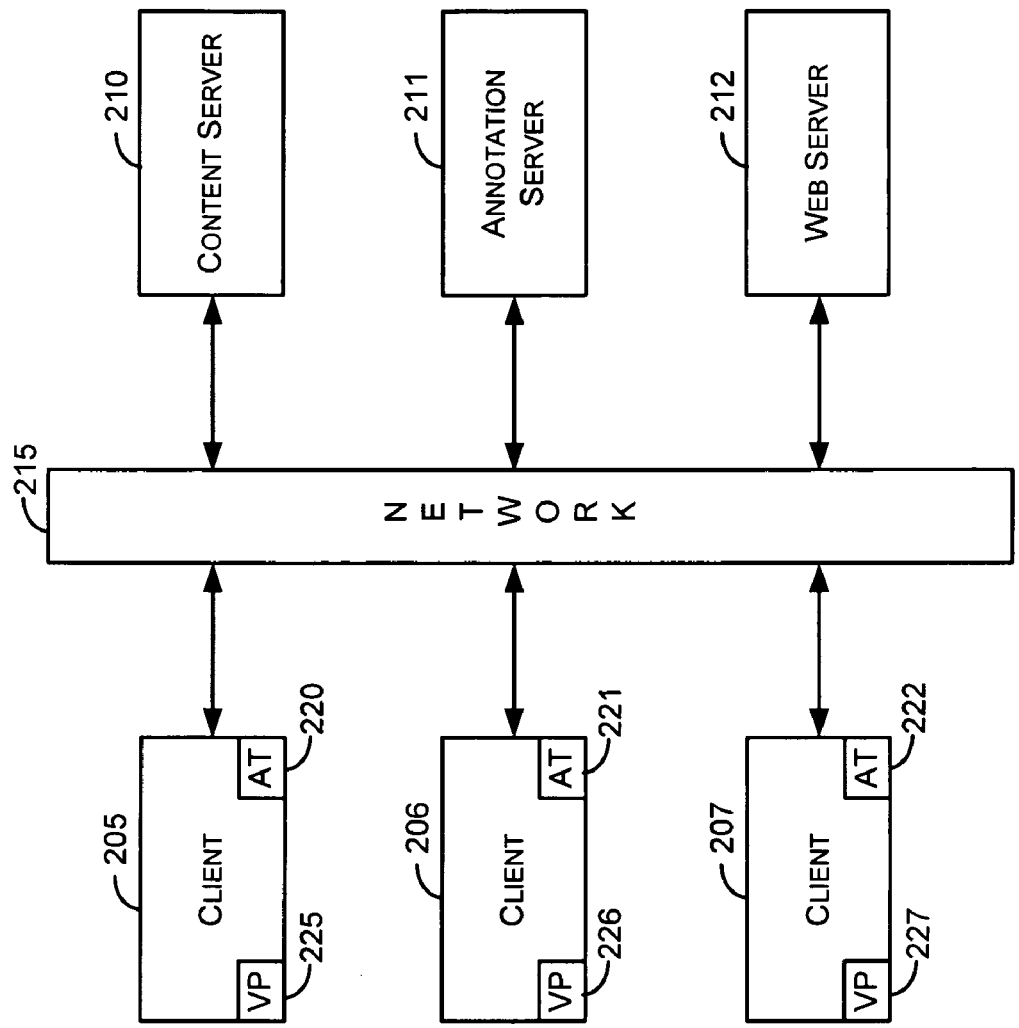
FIG. 2 is a block diagram representing an exemplary environment in which aspects of the subject matter described herein may be implemented.

FIG. 2 is a block diagram representing an exemplary environment in which aspects of the subject matter described herein may be implemented. The environment includes clients 205-207, servers 210-212, and a network 215 and may include other entities (not shown). The clients 205-207 may include annotation tools 220-222, respectively, and video player components 225-227, respectively. The clients and servers are sometimes referred to herein as entities.

The various entities may communicate with each other via various networks including intra- and inter-office networks and the network 215. In an embodiment, the network 215 may comprise the Internet. In an embodiment, the network 215 may comprise one or more private networks, virtual private networks, and the like.

Each of the clients 205-207 and the servers 210-212 may be implemented on or as one or more computers (e.g., the computer 110 as described in conjunction with FIG. 1). The clients 205-207 may each host an Internet browsing application that may be used to access content on the Web server 212, for example.

The Web server 212 provides Web pages to requesting clients. As is known to those skilled in the art, Web pages may display a variety of content including text and graphics each of which may be static or dynamic. A browser may be capable of displaying video in a Web page displayed in the browser. Tags or other data within the Web page may indicate where the video content is stored (e.g., on the content server 210). A video player component associated with the browser may use the tags or other data to locate a content server (e.g., the content server 210) upon which the video content is stored. Using this information, the video player component may download the video from the content server 210 and display the video within the browser.

Although the term Web page is sometimes, aspects of the subject matter described herein are also applicable to e-mail, a blog, other content sharing mechanisms, and the like.

Furthermore, in one embodiment, the term video as used herein is to be read to include any type of content that includes more than one displayable screen arranged in a time-sequenced manner. For example, the graphics display of a game may be considered as a video. As another example, a presentation that is presented as a set of slides may be considered as video. As some other examples, podcasts and animations may be considered as video. Based on the definition above, other examples of videos will be apparent to those skilled in the art.

In another embodiment, the term video is to be read to include any type of content that is displayed according to the traditional video format having a particular number of frames per second, and so forth.

The video players 225-227 have the capability of downloading and presenting annotations that are associated with a video. An annotation may be associated with a particular time segment of the video, with the video as a whole, with a combination of the above, and the like. Annotations may include additional content a user has associated with the video. Some exemplary annotations include text, audio including voice, music, and other sound, and graphics.

An annotation may include a skin, theme, or the like applied to user interface elements associated with a video player. A skin may comprise a custom graphical appearance associated with a video player or other user interface elements. For example, a user may annotate a video such that the video player displays a frame having a certain color and pattern. In conjunction with sharing a video, an annotator may be presented with a user interface allowing the annotator to select the skin, theme, or the like to be applied to user interface elements associated with the video player. This provides a way of customizing the playback experience in a manner selected by the annotator.

In one embodiment, graphics may be presented in the form of digital ink. For example, an annotation tool may allow a user to use a mouse or other input device to draw lines or other graphics on a segment of the video. When the video is replayed, these annotations may be presented as drawn by the user at the specific segment of the video. An image annotation may also have an accompanying text annotation. Some representations of exemplary annotations are described in conjunction with FIGS. 3 to 7.

In conjunction with presenting a video, a video player may present any annotations associated with the video. For example, at a time segment in the presentation of the video, the video player may present a message box that provides a comment about what is being presented. As another example, the video player may have a skin or theme applied to various elements of its user interface. This skin or theme may be viewable before a video is played within the video player and may be persisted until changed. As yet another example, the video player may display a persistent message regarding the video at a location next to or close to the video.

A user may be able to select an indicator associated with an annotation to jump to a segment of the video with which the annotation is associated. For example, referring to FIG. 3, by selecting the annotation indicator 320, the user may cause the video playback to jump to the start of the video segment associated with the annotation indicator 320. As another example, by selecting the user interface element 415 of FIG. 4, a user may cause the video playback to jump to a video segment associated with a prior or subsequent annotation than the one currently being viewed.

By hovering over an annotation indicator a user may be able to see the comment as well as an icon associated with the annotator and a link that causes playback to jump to the video segment associated with the annotation. For example, by hovering over the annotation indicator 320 of FIG. 3, a user may be presented with the message box 405 and may be able to click on the time stamp 407 to move to the start of the video segment associated with the annotation.

The annotations associated with a particular video may be stored on the annotation server 211. Tags within a Web page or other data may be used to identify the annotations associated with a video. The video player may retrieve all of the annotations associated with a particular video before presenting the video or may retrieve the annotations while presenting the video.

An annotation tool (e.g., each of the annotation tools 220-222) may be used to annotate videos. The annotation tool may present one or more user interface that is described in more detail in conjunction with FIGS. 3 through 10. In conjunction with annotating a video, the annotation tool may save the annotations on the annotation server 211.

Although the content server 210 and the Web server 212 are shown as separate entities, in other embodiments, they may be the same entity or may by distributed over many entities. In some embodiments, one or more of the servers 210-211 or portions of the content contained thereon may be included on one of the clients 205-207.

Although when requesting Web pages and other content, the clients 205-207 may act as clients, at other times, they may act as server (e.g., when serving content or responding to requests) or peers to each other or other entities. Likewise, the servers 210-212, are not restricted to providing services such as providing content and may engage in activities in which they request content, services, a combination of content and services, and the like from other devices.

Although the environment described above includes three clients and three servers, it will be recognized that more, fewer, or a different combination of these or other entities may be employed without departing from the spirit or scope of aspects of the subject matter described herein. Furthermore, the entities and communication networks included in the environment may be configured in a variety of ways as will be understood by those skilled in the art without departing from the spirit or scope of aspects of the subject matter described herein.

FIGS. 3-8 illustrate some exemplary user interfaces in accordance with aspects of the subject matter described herein. It is not intended by presenting the exemplary user interfaces illustrated in FIGS. 3-8 to limit aspects of the subject matter described herein to the exact form, format, or number or type of user interface elements displayed. Indeed the form, format, the arrangement of elements, the number of elements, the types of elements, and so forth may be changed in a variety of ways as will be understood by those skilled in the art without departing from the spirit or scope of aspects of the subject matter described herein. Furthermore, the way in which the elements interact with each other and with the user may also be changed in many different ways as will be understood based on the teachings herein, without departing from the spirit or scope of aspects of the subject matter described herein.

Figure 3:
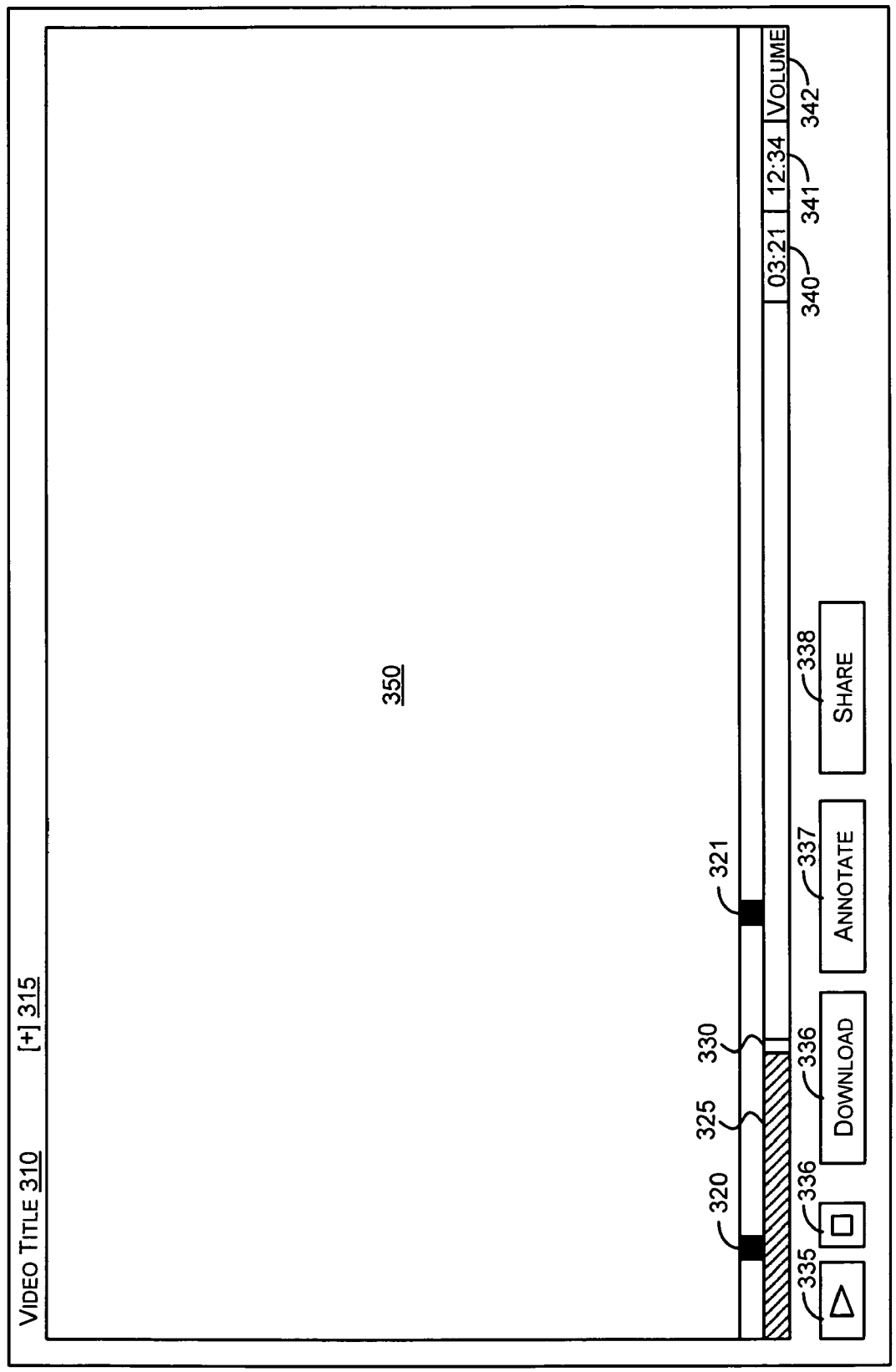
FIG. 3 illustrates some elements of an exemplary user interface that may be presented by an annotation tool and/or video player in accordance with aspects of the subject matter described herein.

FIG. 3 illustrates some elements of an exemplary user interface that may be presented by an annotation tool and/or video player in accordance with aspects of the subject matter described herein. The user interface 305 includes a title 310, additional information indicator 315, annotation indicators 320-321, progress bar 325, progress slider 330, buttons 335-338, status indicators 340-342, and video display pane 350. Each of the above may be referred to as a user interface element.

The title 310 is where text indicating the title of the video may be displayed. The additional information indicator 315 may be selected or hovered over with a pointer to display additional information about the video such as an expanded title, author, chapter, section, other information, and the like.

The annotation indicators 320-321 indicate where annotations have been added to time segments of the video. When an annotation indicator is selected or hovered over, the annotation tool may display the annotation associated with the annotation indicator as described in more detail in conjunction with FIG. 4.

The progress bar 325 indicates how far through the video the current position in the video is. The progress slider 330 may be used to quickly move the current position in the video forwards or backwards. As the progress bar 325 increases, the progress bar may fill a timeline that corresponds to the length of the video.

The play button 335 allows a user to indicate that the video is to begin or resume playing. Clicking on the play button 335 while the video is playing may cause the video to pause until the play button 335 is again selected.

The stop button 336 may cause playback of the video to stop. In some embodiments, pressing the stop button 336 may cause the current position in the video to be reset to the beginning of the video.

Clicking the download button 336 may allow the user to store a video to a hard drive or other non-volatile memory. In addition, clicking the download button 336 may also present a user interface that allows the user to select the video format (e.g., MP3, PSP, WMA, WMV, etc.) in which the video is to be stored.

Figure 5:
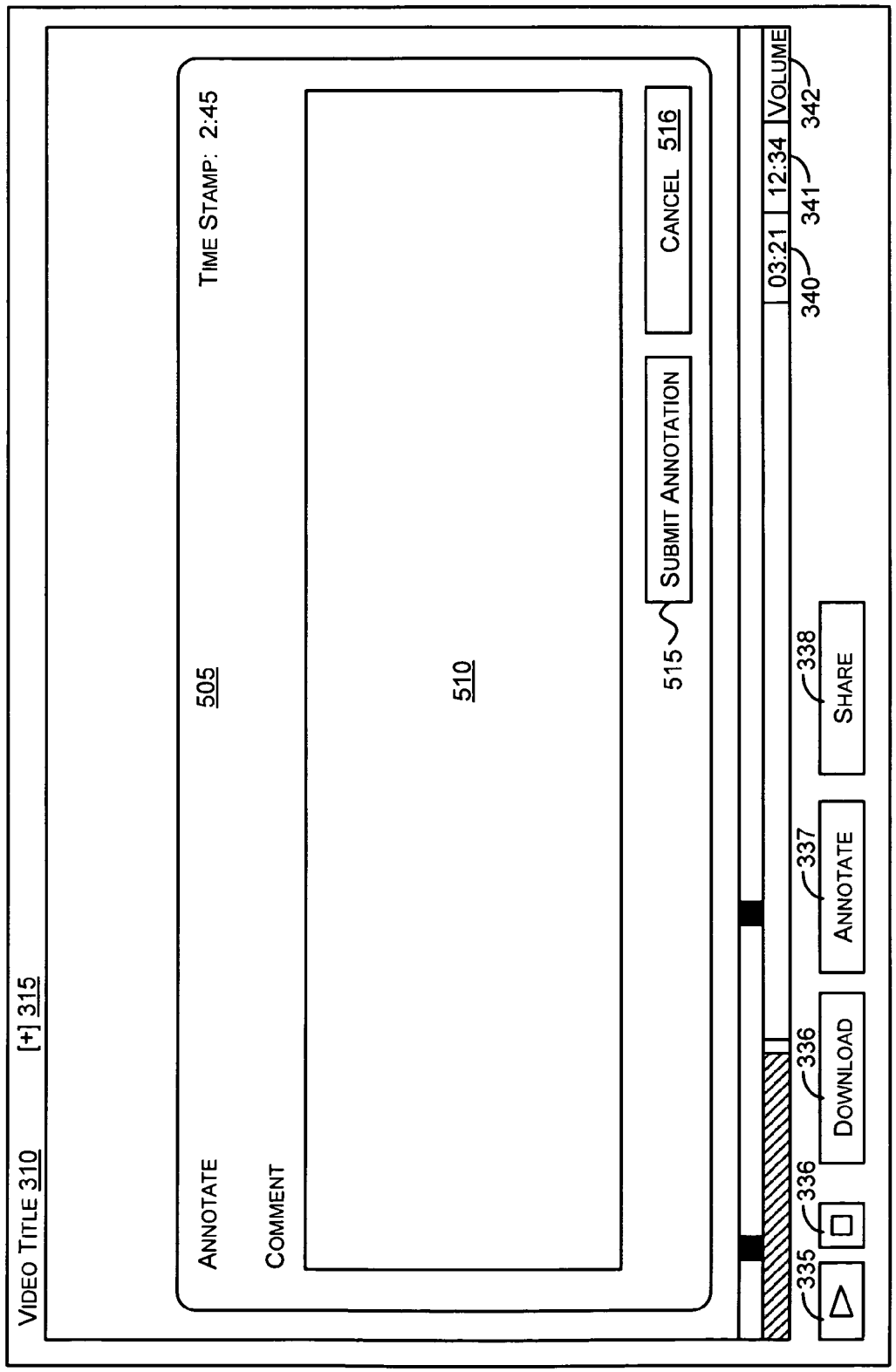
FIG. 5 illustrates an exemplary user interface that may be displayed to receive text annotations in accordance with aspects of the subject matter described herein.

The annotate button 337 may allow the user to annotate the video at the current or another position in the video. Clicking the annotate button 337 may cause a user interface to be displayed that allows the user to select what type of annotation (e.g., graphics, text, audio) the user desires to associate with the current position in the video. FIG. 5 illustrates an exemplary user interface that may be used to receive text annotations.

Figure 6:
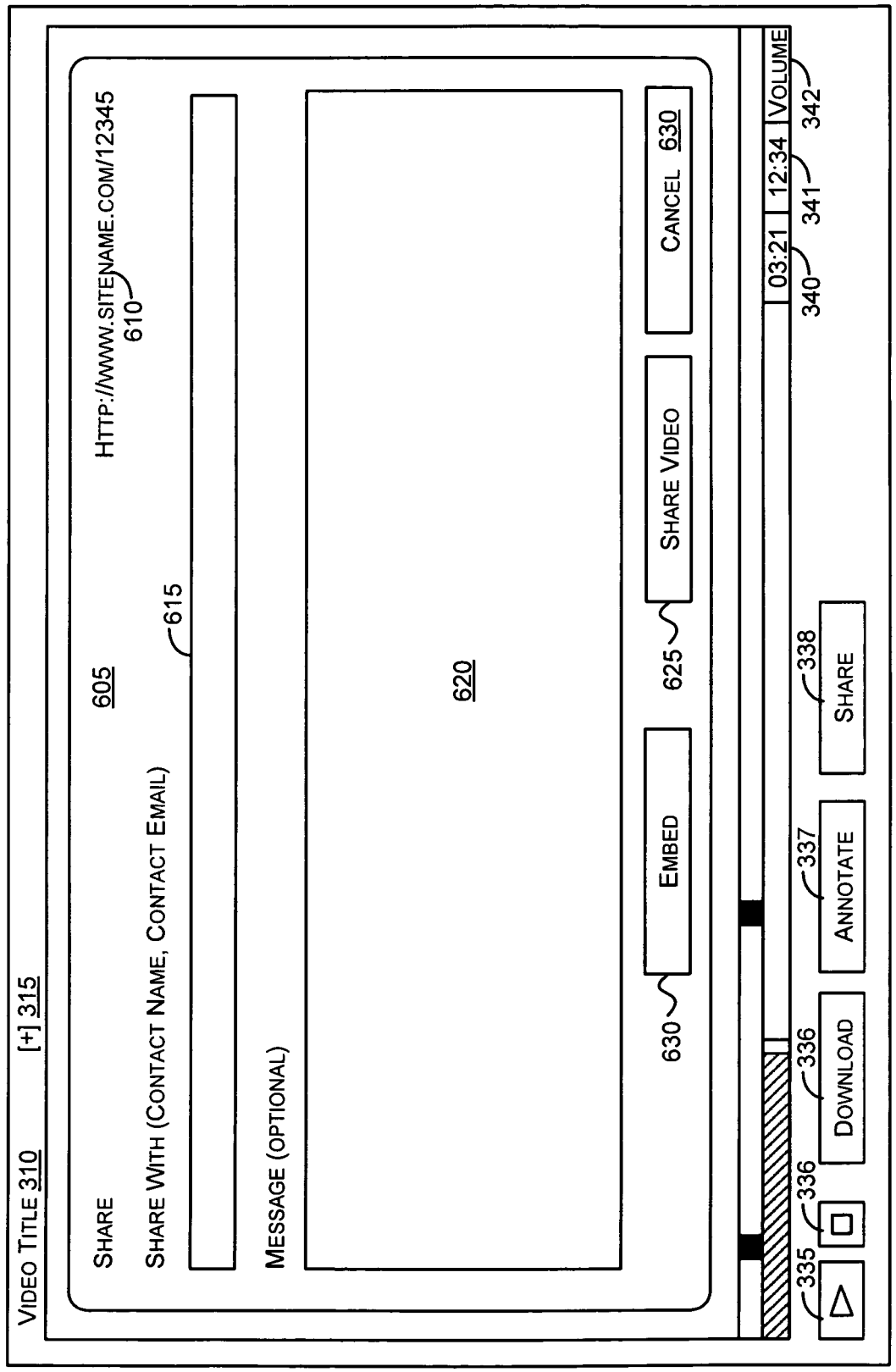
FIG. 6 illustrates an exemplary user interface that may be displayed to share the annotated video in accordance with aspects of the subject matter described herein.

The share button 338 may allow the user to share the annotated video with others. Clicking on the share button 338 may cause a user interface to be displayed that allows the user to share the annotated video. FIG. 6 illustrates an exemplary user interface that may be displayed to share the annotated video.

The status indictor 340 may indicate how many minutes into the video the current position is. In another embodiment, the status indicator 340 may indicate how much time is left in the video from the current position.

The status indicator 341 may indicate may many minutes long the video is. In another embodiment, the status indicator 341 may indicate how much time is left in the video from the current position.

The volume indicator 342 may indicate the volume level of the video and may allow the user to adjust the volume.

The video display pane 350 may be used to display video and annotations. In one embodiment, the entire user interface 305 may be embedded in a browser. In another embodiment, the user interface 305 may be launched by a browser to display annotated video.

The elements described above are meant to be exemplary. In other embodiments, more, fewer, or different elements may be included in a user interface of an annotation tool. For example, there may be buttons that allow video loading, full screen video playback, the ability to navigate the video (e.g., via chapters, segments, or the like), and the like.

Figure 4:
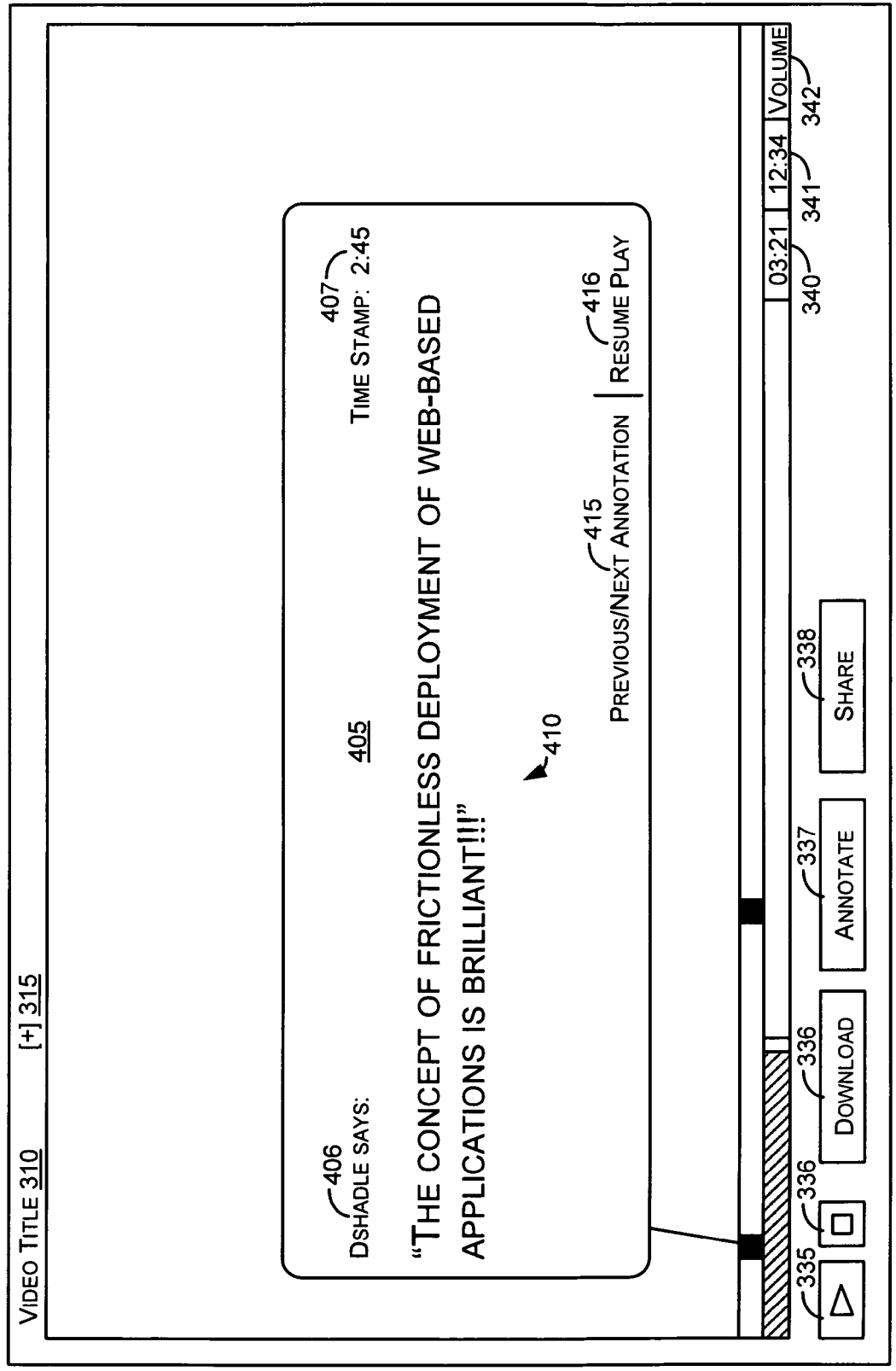
FIG. 4 illustrates some elements of an exemplary user interface that may be presented by an annotation tool in accordance with aspects of the subject matter described herein.

FIG. 4 illustrates some elements of an exemplary user interface that may be presented by an annotation tool in accordance with aspects of the subject matter described herein. The user interface 400 includes various elements, some of which have been described in conjunction with FIG. 3. The elements associated with the reference numerals starting with the number 3 have been described in conjunction with FIG. 3, but some additional detail for some of those elements may also be described below.

When the user selects or hovers a pointer over the annotation indicator 320 the message box 405 may be displayed. The message box 405 may include a user name 406 (e.g., DShadle), a time stamp 407 (e.g., 2:45) in the video with which the annotation is associated. Content of the text annotation (e.g., the text 410) may be displayed in the message box 405. The user interface elements 415 and 416 may be displayed to allow the user to jump to the previous or next annotation or to resume play of the video.

Audio and graphic annotations may also be presented in a similar user interface. For example, audio annotations may include the user name 406, time stamp 407, user interface elements 415-416, and may also include buttons for playing, stopping, rewinding, fast forwarding, and resuming the audio annotation.

Graphics annotations may include similar buttons for displaying a graphic annotation. A graphic annotation may be static (e.g., an illustration that does not change over the length that it is displayed) or dynamic. A dynamic graphic illustration may comprise a set of one or more frames that are associated with a video segment of the video. When a dynamic graphic annotation is encountered, the set of one or more annotated frames may be displayed and overlaid over the frames of the video.

FIG. 5 illustrates an exemplary user interface that may be displayed to receive text annotations in accordance with aspects of the subject matter described herein. The user interface 500 may display an annotation pane 505 that includes a comment pane 510 in which text may be entered. Once the user is satisfied with the text, the user may click on the submit annotation button 515. Doing so may cause the text annotation to be stored locally on the user's machine and/or to be submitted to an annotation server (e.g., the annotation server 211) together with other annotation information (e.g., a user name and time stamp). If the user wishes to cancel the annotation, the user may click the cancel button 516.

FIG. 6 illustrates an exemplary user interface that may be displayed to share the annotated video in accordance with aspects of the subject matter described herein. The user interface 600 includes a share pane 605 that includes a URL (Uniform Resource Locator) 610. The URL 610 may indicate, for example, a Web site upon which the video and/or annotation is stored.

In an embodiment, the user interface 600 may include a user interface element (e.g., the embed button 630). When the user clicks on the embed button 630, the user interface 600 may display a message box that displays a string that includes tags that identify where the video content and the annotations are stored. By pasting this string into a Web page, the user may share the annotated video with anyone who views the Web page who has a browser with an appropriate video player.

The share pane 605 may also include a contact box 615 and a message box 620. In the contact box 615, the user may type contact names and/or contact e-mails of people with which the annotated video is to be shared. The contact box 615 may allow the user to select contacts from a list maintained by a contact database. In the message box 620, the user may type a message to be associated with the annotated video.

When the user clicks on the share video button 625, a message may be sent to each contact in the contact box 615. In one embodiment, the message may include the message indicated in the message box 620 together with data (e.g., a hyperlink or other data) that allows the user to access the annotated video. In some embodiments, when an e-mail client is capable of displaying the annotated video, the message box 620 may be displayed in the e-mail client as an annotation to the video.

In some embodiments, when the user clicks on the share video button 625, the actions associated with the embed button 630 as described above and/or the actions described in the preceding paragraph may occur. For example, referring to FIGS. 3-5 and 7-8, in some embodiments, clicking on the share button 338 may cause e-mails to be sent to others as described above and/or a message box to be displayed that includes a string with tags to identify where the video content and the annotations are stored as described above. In such embodiments, the embed button 630 may be omitted.

In yet another embodiment, a message may be sent to each contact in the contact box 615 together with a link to the annotated video. The message entered in the message box 620 may be displayed next or near to a video. An example of this embodiment is illustrated in FIG. 7 where, in another embodiment, the user interface elements 715-716 may be omitted.

Figure 7:
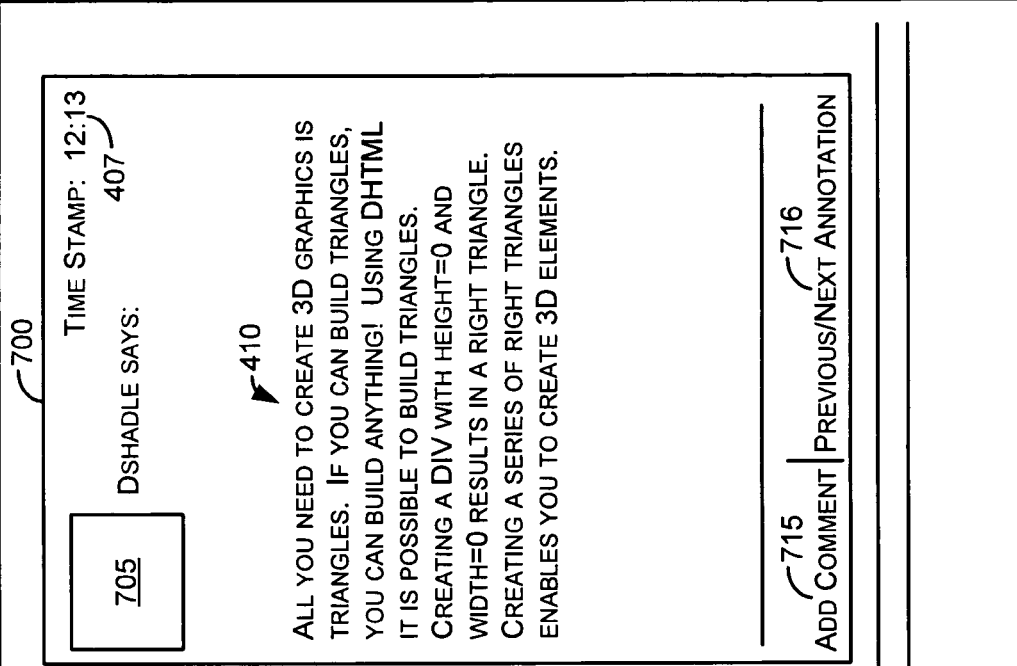
FIG. 7 illustrates some elements of another exemplary user interface that may be presented in accordance with aspects of the subject matter described herein.

FIG. 7 illustrates some elements of another exemplary user interface that may be presented in accordance with aspects of the subject matter described herein. In FIG. 7, a user interface 702 includes an annotation pane 700 that is shown near or next to a video display pane 350.

The annotation pane 700 may include an image 705 associated with the user who made the annotation, a time stamp 407, annotation text 410, and user interface elements 715-716. In one embodiment, the annotation pane 700 is displayed during the time segment 710. In another embodiment, the annotation pane 700 is displayed throughout the playback of the video. In yet another embodiment, the annotation pane 700 is displayed during video playback to present one or more annotations to the video.

The add comment user interface element 715 allows a user who is viewing the annotation to add an additional annotation that is associated with the same location in the video. If the user shares this annotated video, the users who receive the annotated video can see the annotation text 410 and the added annotation text and may also be allowed to further annotate the video.

The previous/next annotation user interface element 716 allows the user to navigate to previous and subsequent annotations associated with the video.

Figure 8:
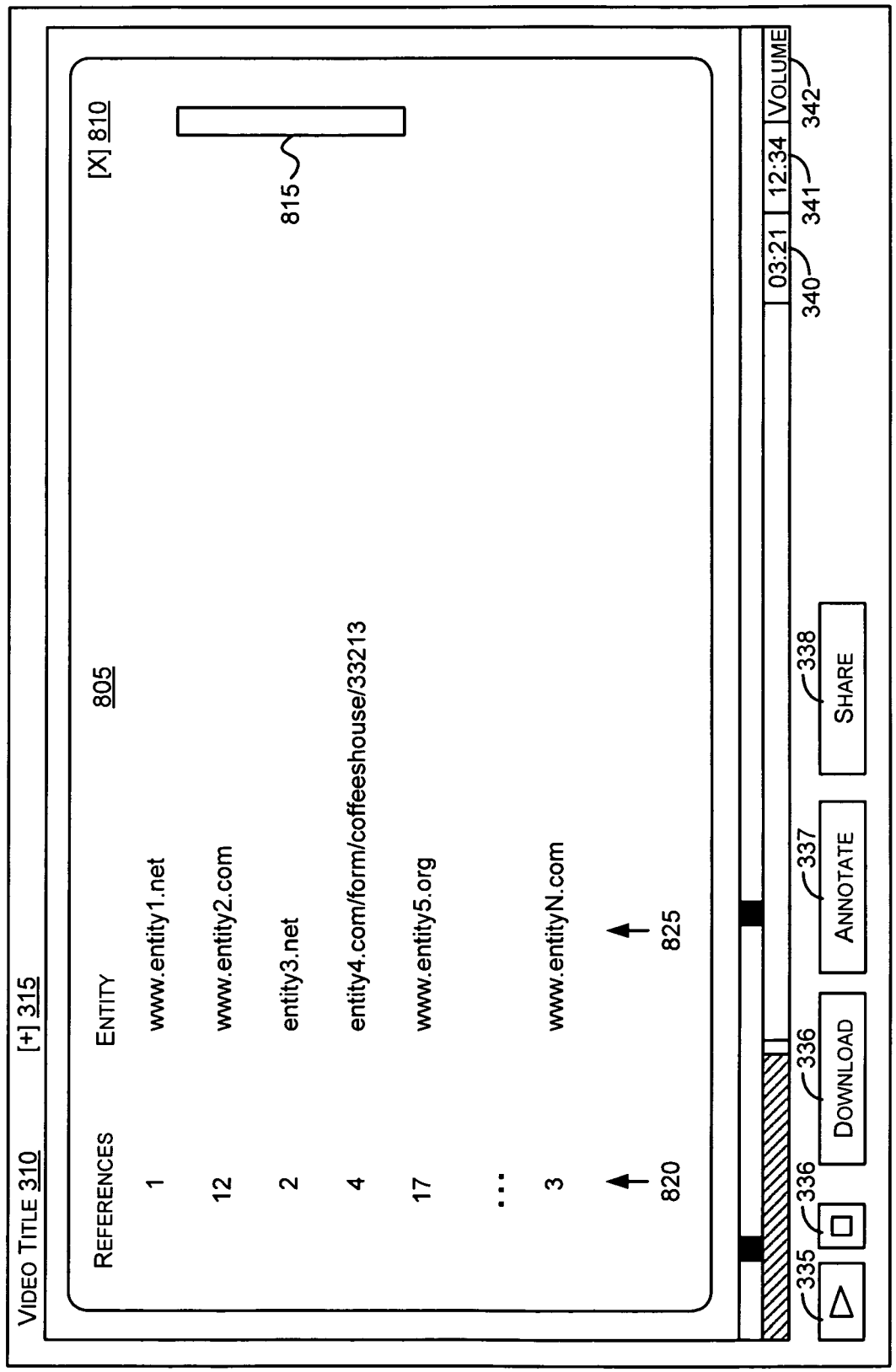
FIG. 8 illustrates some elements of another exemplary user interface that may be presented to display a number of times an annotated video has been shared in accordance with aspects of the subject matter described herein.

FIG. 8 illustrates some elements of another exemplary user interface that may be presented to display a number of times an annotated video has been shared in accordance with aspects of the subject matter described herein. The user interface 800 may include a pane 805 that displays the number of times an annotated video has been shared (e.g., rows in the references column 820) and the entity that shared the annotated video (e.g., rows in the entity column 825).

In addition, the pane 805 may include a user interface element 810 by which the pane 805 may be closed. Furthermore, the user interface pane 805 may include or be associated with a user interface element 815 that allows a user to scroll through information to view information that is not currently displayed in the pane 805.

The pane 805 may also include a link (not shown) to the annotated video if desired.

The format of display indicated in FIG. 8 is meant to be exemplary and is not intended to be exhaustive or all-inclusive of all ways in which this information may be presented. Indeed, based on the teachings herein, those skilled in the art will recognize many different ways in which the information described above may be displayed and viewed such as using a drop down list control, a grid control, and other mechanisms without departing from the spirit or scope of aspects of the subject matter described herein.

Furthermore, in some embodiment, the user interface may be modified to indicate in real-time when a contact has created an annotation to a video that has been shared with the contact. For example, an entry in the column 820 may be used to indicate if a corresponding entity referenced in the entity column 825 has further annotated the shared video.

Figure 9:
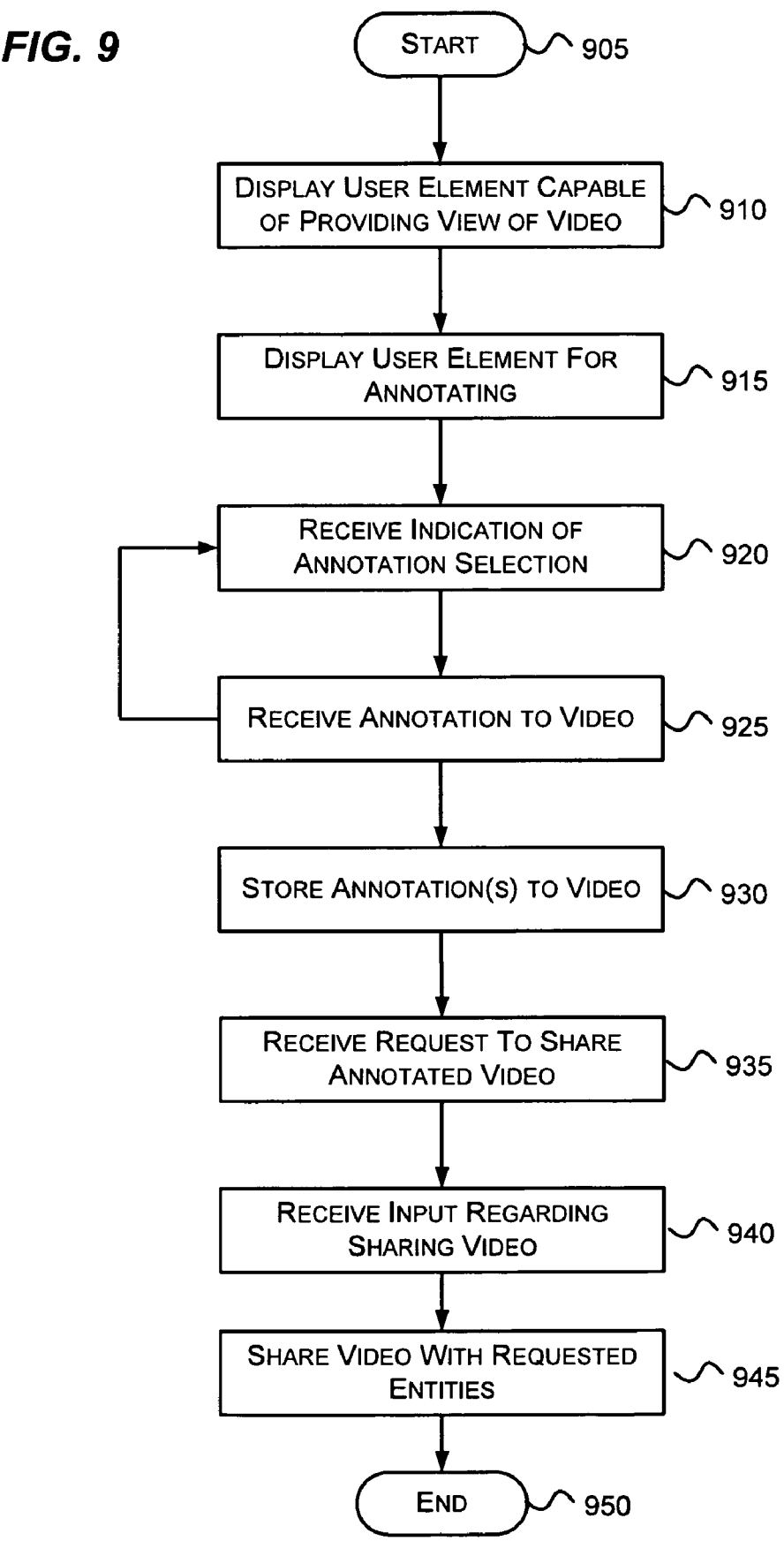
FIGS. 9-10 are flow diagrams that generally represent exemplary actions that may occur in annotating and sharing content in accordance with aspects of the subject matter described herein.
Figure 10:
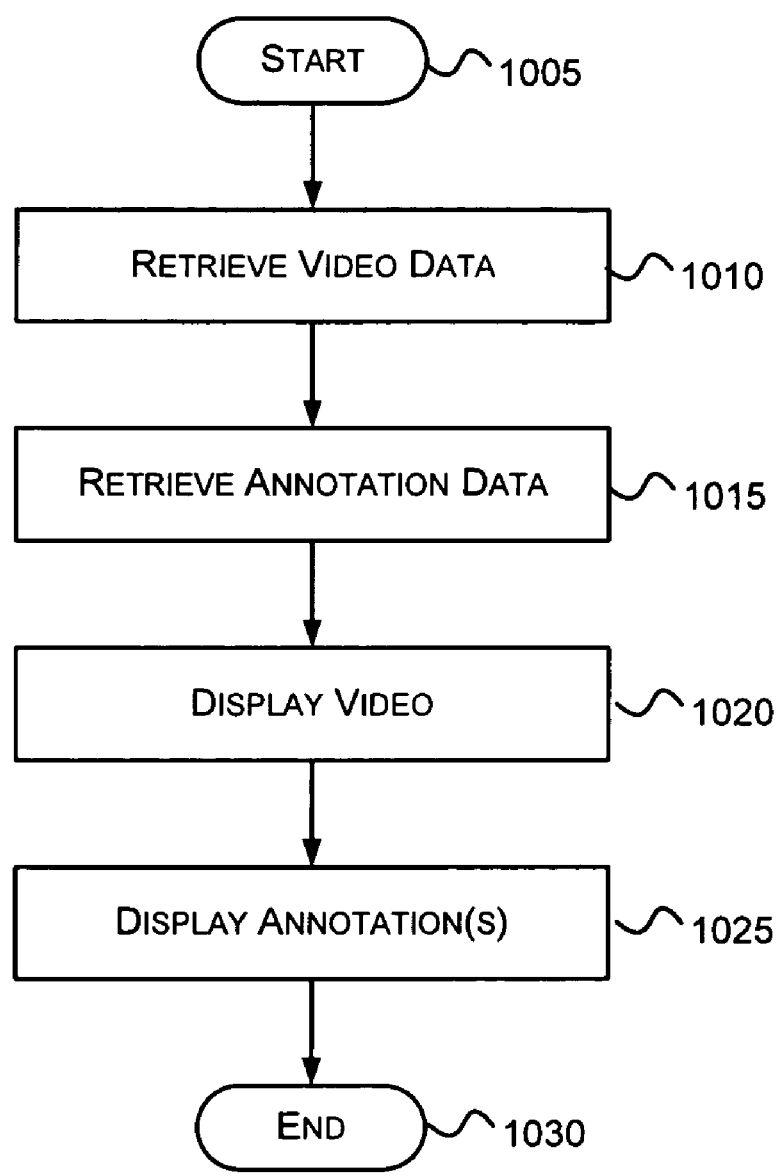

FIGS. 9-10 are flow diagrams that generally represent exemplary actions that may occur in annotating and sharing content in accordance with aspects of the subject matter described herein. For simplicity of explanation, the methodology described in conjunction with FIGS. 9-10 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Turning to FIG. 9, at block 905, the actions begin. At block 910, a first user interface element is displayed. The first user interface element is capable of providing a view of a video. For example, referring to FIG. 3, the user interface 305 is displayed having a pane 350 that is capable of providing a view of a video.

At block 915, a second user interface element is displayed that is associated with annotating the video. For example, referring to FIG. 3, the annotate button 337 is displayed.

At block 920, an indication of a selection of is received. For example, referring to FIG. 3, the annotate button 337 is clicked on by a user. This causes an indication that the button has been clicked on to be sent to a user interface element (e.g., the button 337).

At block 925, in response to receiving an indication of selection of the second user interface element, an annotation to the video is received. For example, referring to FIG. 5, a user enters a text annotation in the comment pane 510. The user may enter more than one annotation to a video which is represented by a line back to the box 920.

At block 930, one or more annotations are stored outside of data the represents the video. For example, referring to FIG. 5, the user clicks on the submit annotation button 515. Referring to FIG. 2, the client the user was using (e.g., assume the client 205) causes the annotation to be stored on the annotation server 211.

At block 935, a request to share the annotated video is received. For example, referring to FIG. 3, the user clicks on the share button 338.

At block 940, data regarding with whom the annotated video is to be shared is received. For example, referring to FIG. 6, the user types in and/or selects contact information in the contact box 615.

At block 945, the video is shared with the requested entities. For example, referring to FIG. 6, the tool providing the user interface 600 sends an e-mail to each contact indicated in the contact box 615 and provides a link to the annotated content.

At block 950, the actions end.

Turning to FIG. 10, at block 1005, the actions begin. At block 1010, video data that corresponds to a video is retrieved. For example, referring to FIG. 2, the client 205 retrieves a video (or portion thereof) from the content server 210.

At block 1015, annotation data that includes one or more annotations to the video is retrieved. For example, referring to FIG. 2, the client 205 retrieves annotation data from the annotation server 211.

At block 1020. A view of the video is displayed in a first portion of a user interface. For example, referring to FIG. 3, the view is displayed in the pane 350.

At block 1025, an annotation user interface element is displayed that provides the capability of navigating to an annotation associated with the video. For example, referring to FIG. 3, the annotation indicators 320 and 321 allow the user to navigate to annotations associated with the video. As another example, referring to FIG. 4, the user interface element 415 allows the user to navigate to previous and next annotations. As yet another example, referring to FIG. 7, the previous/next annotation user interface element 716 allows the user to navigate to previous and subsequent annotations associated with the video.

At block 1030, the actions end.

As can be seen from the foregoing detailed description, aspects have been described related to annotating and sharing content. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:
   displaying a first user interface element that is capable of providing a view of a video;
   displaying a second user interface element that is associated with annotating the video;
   receiving an indication of a selection of the second user interface element;
   in response to receiving the indication, receiving an annotation to the video, the annotation comprising a user name associated with the annotation and a user image associated with the annotation;
   storing the annotation outside of data that represents the video;
   embedding in a web page a tag that identifies the annotation;
   embedding in the web page a tag that identifies the video;
   retrieving video data that corresponds to the video based on the tag embedded in the web page that identifies the video data;
   retrieving annotation data that includes the annotation to the video based on a tag embedded in the web page that identifies the annotation data, the annotations stored outside of the video data;
   displaying a view of the video in a first portion of a user interface;
   presenting an annotation at an annotated time while the video is being played, wherein presenting an annotation at an annotated time while the video is being played comprises displaying the annotation overlaid over the view of the video in the first portion of the user interface, and
   displaying an annotation user interface element that provides a capability of navigating to a retrieved annotation associated with the video, the retrieved annotation comprising a user name associated with the annotation and a user image associated with the annotation.

2. The method of claim 1, wherein receiving an annotation to the video comprises displaying a third user interface element that indicates annotation options, receiving a selection of the third user interface element that indicates a selected annotation option, receiving annotation according to the selected annotation option.

3. The method of claim 2, wherein the annotation option comprises one or more of a graphical annotation, a textual annotation, and a voice annotation.

4. The method of claim 2, wherein the annotation option comprises an option to apply a skin to a video player that displays the video as annotated, the skin comprises a custom graphical appearance associated with the video player.

5. The method of claim 2, wherein the annotation option comprises an option to enable additional navigation in presenting the video.

6. The method of claim 1, wherein the annotation comprises an audio annotation.

7. The method of claim 1, wherein the annotation is associated with a time segment of the video, the time segment having a start time and a stop time, the annotation being presented during playback of the video between the start time and the stop time.

8. The method of claim 1, wherein the video comprises pre-existing content comprising one or more of a presentation that includes one or more slides, a podcast, an animation sequence, a video display of a game, and two or more displayable screens arranged in a time-sequenced manner.

9. The method of claim 1, receiving a second annotation to the video from a user other than a user that provided the annotation;
storing the second annotation outside of data that represents the video.

10. The method of claim 1, further comprising presenting an annotation already associated with the second user interface element in response to receiving the indication.

11. The method of claim 1, further comprising:
displaying a third user interface element;
receiving an indication of selection of the third user interface element; and
in response to receiving an indication of selection of the third user interface element, presenting a fourth user interface element that receives input for sharing the video as annotated with other users.

12. The method of claim 11, wherein the fourth user interface element comprises a text box for receiving contact information associated with the other users.

13. The method of claim 11, wherein the fourth user interface element comprises a button that, when activated, embeds information into a Web page, the information indicating a location of the video and a location of the annotation, the information formatted for use by a video player for playing the video together with the annotation.

14. A method implemented at least in part by a computer, the method comprising:
retrieving video data that corresponds to a video based on a tag embedded in a web page that identifies the video data;
retrieving annotation data that includes one or more annotations to the video based on a tag embedded in the web page that identifies the annotation data, the annotations stored outside of the video data;
displaying a view of the video in a first portion of a user interface;
presenting an annotation at an annotated time while the video is being played, wherein presenting an annotation at an annotated time while the video is being played comprises displaying the annotation overlaid over the view of the video in the first portion of the user interface, and
displaying an annotation user interface element that provides a capability of navigating to a retrieved annotation associated with the video, the retrieved annotation comprising a user name associated with the annotation and a user image associated with the annotation.

15. The method of claim 14, further comprising applying a skin to elements of the user interface, the skin being dictated by the annotation data, the skin comprises a custom graphical appearance associated with the video player.

16. The method of claim 14, wherein presenting an annotation at an annotated time while the video is being played comprises presenting the annotation in a second portion of the user interface separate from the view of the video in the first portion of the user interface.

* * * * *

UNITED STATES PATENT AND TRADEMARK OFFICE
CERTIFICATE OF CORRECTION

PATENT NO.       : 8,140,973 B2
APPLICATION NO.  : 12/018786
DATED            : March 20, 2012
INVENTOR(S)      : Sandquist et al.

Page 1 of 1

It is certified that error appears in the above-identified patent and that said Letters Patent is hereby corrected as shown below:

In the Claims
In column 13, line 3, In Claim 9, after "claim 1," insert -- further comprising: --.

Signed and Sealed this
Third Day of February, 2015

Michelle K. Lee
*Deputy Director of the United States Patent and Trademark Office*